April 14, 1931.  H. MAASHOFF  1,800,945

RATCHET WHEEL

Filed March 25, 1930

Inventor:
Hugo Maashoff
by Kalver Kalver
Att'ys.

Patented Apr. 14, 1931

1,800,945

UNITED STATES PATENT OFFICE

HUGO MAASHOFF, OF NEW HAVEN, CONNECTICUT, ASSIGNOR TO THE GREIST MANUFACTURING COMPANY, A CORPORATION OF CONNECTICUT

RATCHET WHEEL

Application filed March 25, 1930. Serial No. 438,825.

This invention relates to an improved ratchet wheel more especially intended for use in a sewing machine ruffler having a laterally adjustable pawl. One class of rufflers of this kind having two ratchet wheels placed side by side adjacent to each other has heretofore been used, one of said ratchet wheels having two deep notches, affording relatively long teeth, with intervening shallow notches affording relatively short teeth, and the other of these ratchet wheels having only a single deep notch affording a long tooth with intervening shallow notches, affording short teeth, throughout the remaining circumference of the wheel. These ratchet wheels when in use in the rufflers serve as pattern wheels to control the strokes of the ruffling blades according to the number of stitches of the sewing; the rufflers being operated from the needle bars of the sewing machines. The present invention has for its object to provide a single ratchet wheel which will serve the purpose of the two ratchet wheels heretofore used in sewing machine rufflers. To this end the improved ratchet wheel is constructed so as to afford two deep notches on one side and a single deep notch on its other side.

Figure 1:
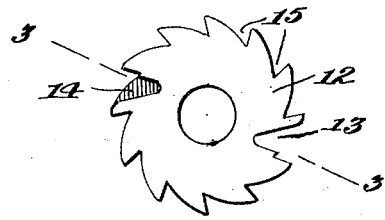
Figure 2:
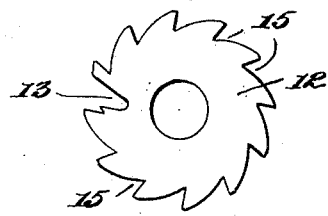
Figure 3:
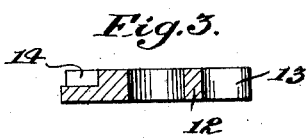

In the drawing Figs. 1 and 2 are opposite side views of the improved ratchet wheel, and Fig. 3 is a transverse section thereof on line 3—3, Fig. 1.

Referring to the drawing, 12 denotes the body of the ratchet wheel which is provided with two deep notches 13 and 14, the notch 14 being about half the thickness of the wheel, while the notch 13 is the full thickness thereof. These deep notches afford relatively long teeth. Intervening between said deep notches are relatively shallow notches 15 affording relatively short teeth. As the notch 13 extends the full thickness of the wheel it will be seen that the said wheel has on one side a single deep notch with intervening shallow notches throughout the circumference of the wheel. From this it results that a pawl mounted on a carrier which is laterally adjustable relative to the ratchet wheel may be so located that in one lateral position of adjustment it will engage that side of the ratchet wheel which has two deep notches, while in another position of lateral adjustment it will drop into the single deep notch at the other side of the ratchet wheel. In the operation of a ruffler when the pawl is in engagement with the shallow notches of the ratchet wheel it will be held inoperative to perform its function, in connection with co-operating parts, in imparting a stroke to the ruffler blade; while when the pawl is in engagement with any one of the deep notches of the ratchet wheel a stroke will be imparted to the ruffling blade.

It will thus be understood that a single ratchet wheel is adapted to perform the functions heretofore performed by two ratchet wheels, thus effecting a saving in the cost of construction in that the deep notch which extends only about half the thickness of the ratchet wheel being easily formed by swaging. As the sewing machine rufflers in connection with which the improved ratchet wheel is intended to be used are made by the thousands, a small saving in the cost of each will amount to a considerable sum in the aggregate.

Having thus described my invention I claim and desire to secure by Letters Patent:

1. A ratchet wheel having two deep notches, affording relatively long teeth, with intervening shallow notches, affording relatively short teeth, one of said deep notches being about half the thickness of said wheel.

2. A ratchet wheel having on one side two deep notches to form two relatively long teeth, with intervening shallow notches affording relatively short teeth, one of said notches being about half the thickness of the wheel and the other being the full thickness thereof; so that said wheel will have two deep notches on one side and a single deep notch on its other side.

3. A ratchet wheel having a deep notch affording a relatively long tooth, with intervening shallow notches, affording relatively short teeth, one of the said shallow notches having the same depth on one side of the ratchet wheel as the said deep notch.

4. A ratchet wheel having one deep notch, affording a relatively long tooth, with intervening shallow notches, affording relatively short teeth, one of said shallow notches being deepened on one side of the ratchet wheel to the same depth as the one deep notch.

In testimony whereof I affix my signature.

HUGO MAASHOFF.